United States Patent Office 2,782,093
Patented Feb. 19, 1957

2,782,093
PROCESS FOR THE PRODUCTION OF ALKALI METAL BICARBONATES

Georges Hulot and Antoine Birman, Paris, France, assignors to Society d'Etudes Chimiques pour l'Industrie et l'Agriculture, Paris, France No Drawing. Application April 4, 1952,
Serial No. 280,648

Claims priority, application France April 7, 1951

12 Claims. (Cl. 23—64)

This invention relates to a process for the production of alkali metal bicarbonates.

It is known to manufacture sodium carbonate by the so-called ammonia-soda process.

It is also known to replace ammonia in this process either by the methylamines obtained by the distillation of beet vinasse or by the ethylamines obtained by decomposition of organic ethers. It has been possible to extend these latter processes to the manufacture of potassium carbonate, which was not possible with the ammonia-soda process proper. It has not been possible to make any substantial industrial use of all these processes employing amines, particularly because of the unacceptable characteristics of their operational conditions.

One of the present applicants, in his application of the March 29, 1951, entitled, "Preparation of Potassium Carbonates" S. N. 218,270, now Patent Number 2,752,-222, has described a process for the manufacture of potassium carbonate in which an amine reagent constituted by a mixture of primary or secondary amines is used in a process analogous to the above mentioned processes; the application of this process has led to novel discoveries and to an extension of the field of application of this process.

The present invention provides a process employing a cycle analogous to that of the so-called ammonia-soda process for the manufacture of alkali metal carbonates (sodium carbonate or potassium carbonate) starting from the corresponding chlorides, in which ammonia is replaced by an amine reagent constituted by an amine or a mixture of amines of molecular weight higher than that of the ethylamines, i. e. having a number of carbon atoms greater than 2, and having boiling points such that they can readily be recovered from their aqueous solutions by simple distillation or azeotropic distillation.

In particular it has been found that amines containing 3 or 4 carbon atoms, propyl and isopropyl amines, butyl and isobutyl amines, more especially fulfill these conditions.

The reaction is probably as follows:

In the presence of carbon dioxide the amine is transformed into the amine carbonate, which reacts with the alkali metal chloride to give the alkali metal bicarbonate which precipitates and the amine hydrochloride:

$2MCl + CO_3(NH_2RH)_2 + CO_2 + H_2O \rightarrow$
$\qquad 2CO_3MH + 2NH_2R,HCl$
$2MCl + CO_3(NHR'_2H)_2 + CO_2 + H_2O \rightarrow$
$\qquad 2CO_3MH + 2NHR'_2,HCl$ wherein M is sodium or potassium
R and R' are alkyl radicals in which the number of carbon atoms is greater than 2.

The amine hydrochloride is recovered from the mother liquors, for example by the action of lime and by distillation.

The potassium bicarbonate separated may be converted into potassium carbonate by any known method.

The process of the invention offers the following characteristic advantages:

(a) The bicarbonation can be carried out at atmospheric pressure, even by using a dilute carbon dioxide gas, such for example as the carbon dioxide gas conventionally produced in lime kilns.

(b) The alkali metal chloride is almost completely utilised, the yield being 95% for sodium chloride or potassium chloride.

(c) The operation can take place in a concentrated reaction solution, which offers a double advantage: for a given production an apparatus reduced of volume is employed; moreover the loss of reactive material is less, the more concentrated is the solution with which one works.

(d) Because of the high coefficient of volatility of the selected amines or mixtures of amines, their distillation from the aqueous solutions which contain them is easy and economical; in spite of their relatively high boiling point.

(e) It is possible to use stoichiometrical proportions of amines and alkali metal chlorides whilst preserving a substantially quantitative yield. An enormous simplification in the conventional processes of distillation and recovery of reactive material results from the fact that, at the end of the operation, substantially the whole of the amine is present in the form of hydrochloride. It is thus possible to simplify the recovery tower by omitting the part in which the amine carbonate is normally distilled.

The following examples show how the process of the invention may be carried into effect:

Example 1

70 gm. of common salt are brought into contact with 200 cc. of a 40% aqueous solution of isopropylamine. The mixture is stirred moderately and through it there is passed a stream of carbon dioxide gas diluted to 35% with an inert gas (for example nitrogen) without altering the temperature. At the beginning of the reaction the outflowing gases consist of pure nitrogen. The proportion of carbon dioxide in the outflowing gases increased and the reaction is practically finished when the proportion of carbon dioxide in the outflowing gases reaches the same value as the proportion in the gases passed in. A sodium bicarbonate precipitate is recovered corresponding to a yield of 95%.

Example 2

70 gm. of technical potassium chloride are brought into contact with 200 cc. of a 40% aqueous solution of isobutylamine. The mixture is stirred moderately and into it there is passed a current of carbon dioxide gas such as exit gas from a lime kiln, i. e. diluted in practice to 30%. When the reaction is finished, i. e. when the outflowing gas contains a proportion of 30% of $CO_2$, a potassium bicarbonate precipitate is recovered corresponding to a yield of 95%.

The invention also permits of effecting a certain purification of the potassium salts because, when the technical potassium chloride is used as the starting material, i. e. potassium chloride containing a certain proportion of sodium chloride, after the reaction a potassium bicarbonate is obtained which is very largely freed from sodium.

What we claim is:

1. A process for the production of alkali metal bicarbonates which comprises: reacting carbon dioxide gas at atmospheric pressure with an aqueous solution containing an alkali metal chloride and a member of the group consisting of primary and secondary alkylamines, the alkyl radicals of which contain from 3 to 4 carbon atoms, and then separating the resulting alkali metal bicarbonate from the solution.

2. A process for the production of alkali metal bicarbonates which comprises: reacting pure carbon dioxide gas at atmospheric pressure with an aqueous solution containing an alkali metal chloride and a member of the group consisting of primary and secondary alkylamines, the alkyl radicals of which contain from 3 to 4 carbon atoms, and then separating the resulting alkali metal bicarbonate from the solution.

3. A process for the production of alkali metal bicarbonates which comprises: reacting dilute carbon dioxide gas at atmospheric pressure with an aqueous solution containing an alkali metal chloride and a member of the group consisting of primary and secondary alkylamines, the alkyl radicals of which contain from 3 to 4 carbon atoms, and then separating the resulting alkali metal bicarbonate from the solution.

4. A process for the production of potassium bicarbonate which comprises: reacting carbon dioxide at atmospheric pressure with an aqueous solution containing potassium chloride and a member of the group consisting of primary and secondary alkylamines, the alkyl radicals of which contain from 3 to 4 carbon atoms, and then separating the resulting alkali metal bicarbonate from the solution.

5. A process for the production of sodium bicarbonate which comprises: reacting carbon dioxide gas at atmospheric pressure with an aqueous solution containing sodium chloride and a member of the group consisting of primary and secondary alkylamines, the alkyl radicals of which contain from 3 to 4 carbon atoms, and then separating the resulting alkali metal bicarbonate from the solution.

6. A process for the production of potassium bicarbonate which comprises: reacting pure carbon dioxide at atmospheric pressure with an aqueous solution containing potassium chloride and a member of the group consisting of primary and secondary alkylamines, the alkyl radicals of which contain from 3 to 4 carbon atoms, and then separating the resulting alkali metal bicarbonate from the solution.

7. A process for the production of potassium bicarbonate which comprises: reacting dilute carbon dioxide at atmospheric pressure with an aqueous solution containing potassium chloride and a member of the group consisting of primary and secondary alkylamines, the alkyl radicals of which contain from 3 to 4 carbon atoms, and then separating the resulting alkali metal bicarbonate from the solution.

8. A process for the production of sodium bicarbonate which comprises: reacting pure carbon dioxide gas at atmospheric pressure with an aqueous solution containing sodium chloride and a member of the group consisting of primary and secondary alkylamines, the alkyl radicals of which contain from 3 to 4 carbon atoms, and then separating the resulting alkali metal bicarbonate from the solution.

9. A process for the production of sodium bicarbonate which comprises: reacting dilute carbon dioxide gas at atmospheric pressure with an aqueous solution containing sodium chloride and a member of the group consisting of primary and secondary alkylamines, the alkyl radicals of which contain from 3 to 4 carbon atoms, and then separating the resulting alkali metal bicarbonate from the solution.

10. A process in accordance with claim 1 in which the amine reagent is isopropylamine.

11. A process in accordance with claim 1 wherein the amine reagent is isobutylamine.

12. A process in accordance with claim 1 in which the amine reagent is isopropylamine and the alkali metal chloride is potassium chloride.

References Cited in the file of this patent

UNITED STATES PATENTS

| 1,928,540 | Lawaree | Sept. 26, 1933 |
| 2,002,681 | Thorssell | May 28, 1935 |
| 2,013,977 | Weiss | Sept. 10, 1935 |
| 2,177,068 | Hutchinson | Oct. 24, 1939 |
| 2,378,147 | McGeorge | June 17, 1945 |

FOREIGN PATENTS

| 3,967 | Great Britain | of 1878 |